May 24, 1960 — R. D. MOHLER ET AL — 2,938,082

TELEPHONE APPARATUS

Filed Sept. 30, 1954 — 2 Sheets-Sheet 1

INVENTORS
Robert D. Mohler
Edward Bauman
BY Mueller & Aichele
Attys.

May 24, 1960 R. D. MOHLER ET AL 2,938,082

TELEPHONE APPARATUS

Filed Sept. 30, 1954 2 Sheets-Sheet 2

INVENTORS
Robert D. Mohler
Edward Bauman
BY Mueller & Aichele
Attys.

United States Patent Office 2,938,082

Patented May 24, 1960

2,938,082

TELEPHONE APPARATUS

Robert D. Mohler, 114 Chandler, Elmhurst, Ill., and Edward Bauman, 32 Bennett Ave., Galion, Ohio Filed Sept. 30, 1954, Ser. No. 464,559
(Filed under Rule 47(a) and 35 U.S.C. 116)

7 Claims. (Cl. 179—84)

Figure 1:
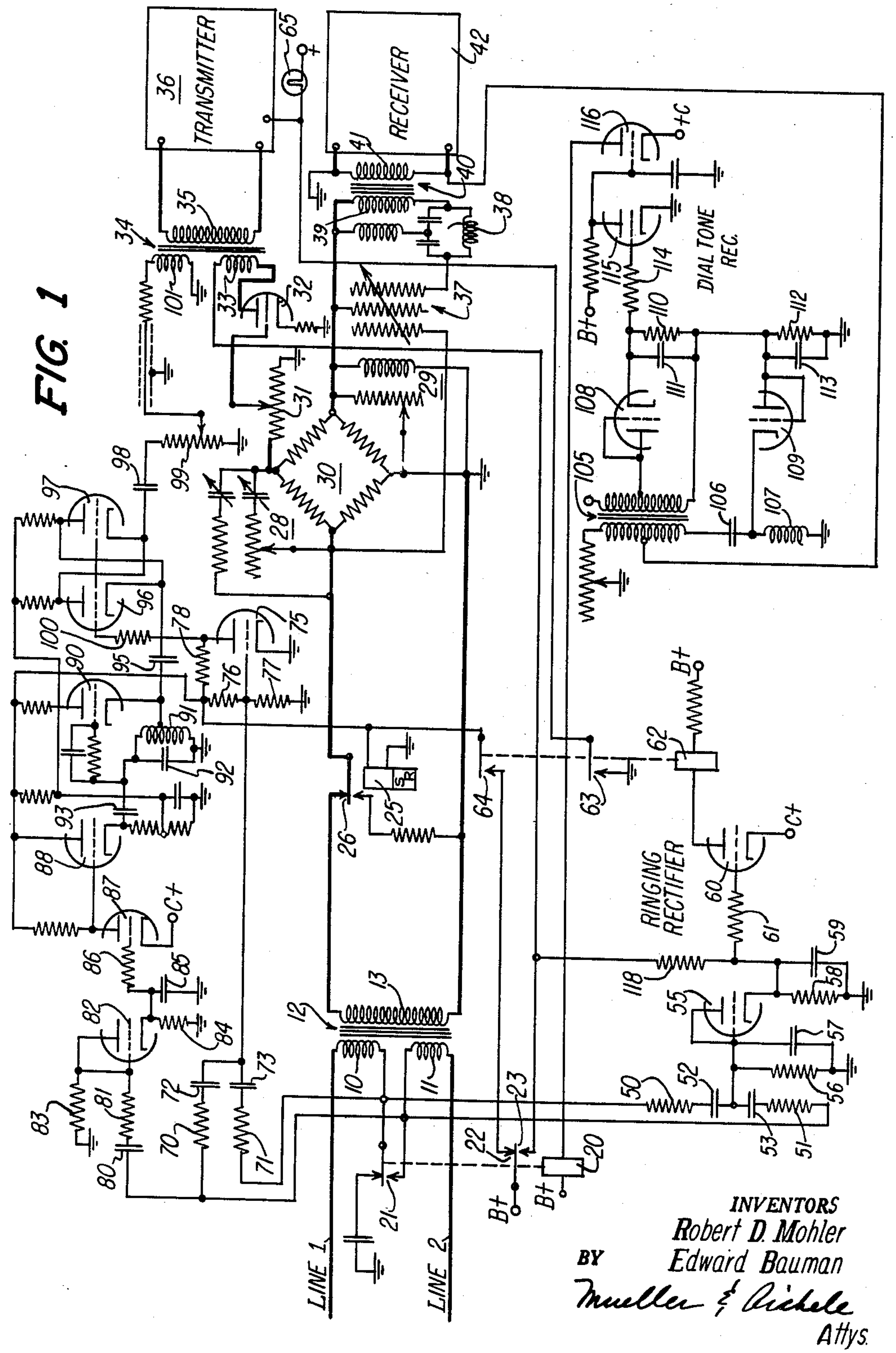

This application relates generally to telephone communication systems and more particularly to apparatus for applying the voice signals as well as control signals for ringing and dialing from a telephone line over a radio link and redeveloping the control signals at the other side to provide standard telephone operation.

In many telephone system applications long distances exist between the exchange and certain extensions, and to provide wire lines over these distances would involve relatively great expense. In such cases it may be more practical to bridge the gap by radio equipment to thereby eliminate the need for interconnecting lines. However, the ringing signals and dialing pulses which are used in standard telephone operations cannot be transmitted in their existing form over radio equipment. Equipment has been provided for transmitting these low frequency signals and pulses over radio links but these have been relatively complicated and extra signaling apparatus is usually required depending upon the particular type of system.

It is therefore, an object of the present invention to provide simple equipment for connecting radio equipment to bridge a gap in a telephone line, with the equipment being suitable for use with various different standard telephone systems.

A further object of the present invention is to provide equipment for converting ringing and dialing signals to audio frequency tone signals of a form suitable for transmission with the voice signals over a carrier or radio channel, together with equipment for converting the tone signals back to their usual form for use in telephone systems.

Another object of this invention is to provide equipment for reproducing low frequency high current signals of various different frequencies, such as the ringing current in a telephone system, by the use of tones which may be easily transmitted over a carrier or radio link.

A feature of the invention is the provision of apparatus for connecting carrier equipment into a telephone line including tone generator and control means operated by the ringing current and dialing pulses to produce tone signals which can be transmitted over the carrier, and which includes control means responsive to the received tone signals for reconstituting the pulses by interrupting the circuits and which provides low frequency ringing current by intermittently switching the polarity of a direct current source.

A further feature of this invention is the provision of apparatus for bridging a gap in a telephone line by a radio channel wherein an audio frequency tone is generated and is keyed at the frequency of the ringing current to produce bursts which may be transmitted over the radio channel, with the received bursts being used to switch a direct current source to provide an alternating current at the ringing frequency. The generated tone may be shifted in frequency to identify the line on which the ringing current is applied and the tone can be keyed at different ringing frequencies, whereby the alternating current produced by switching the direct current source will follow the ringing frequency, and may be applied to the proper line as determined by the frequency of the tone.

Figure 2:
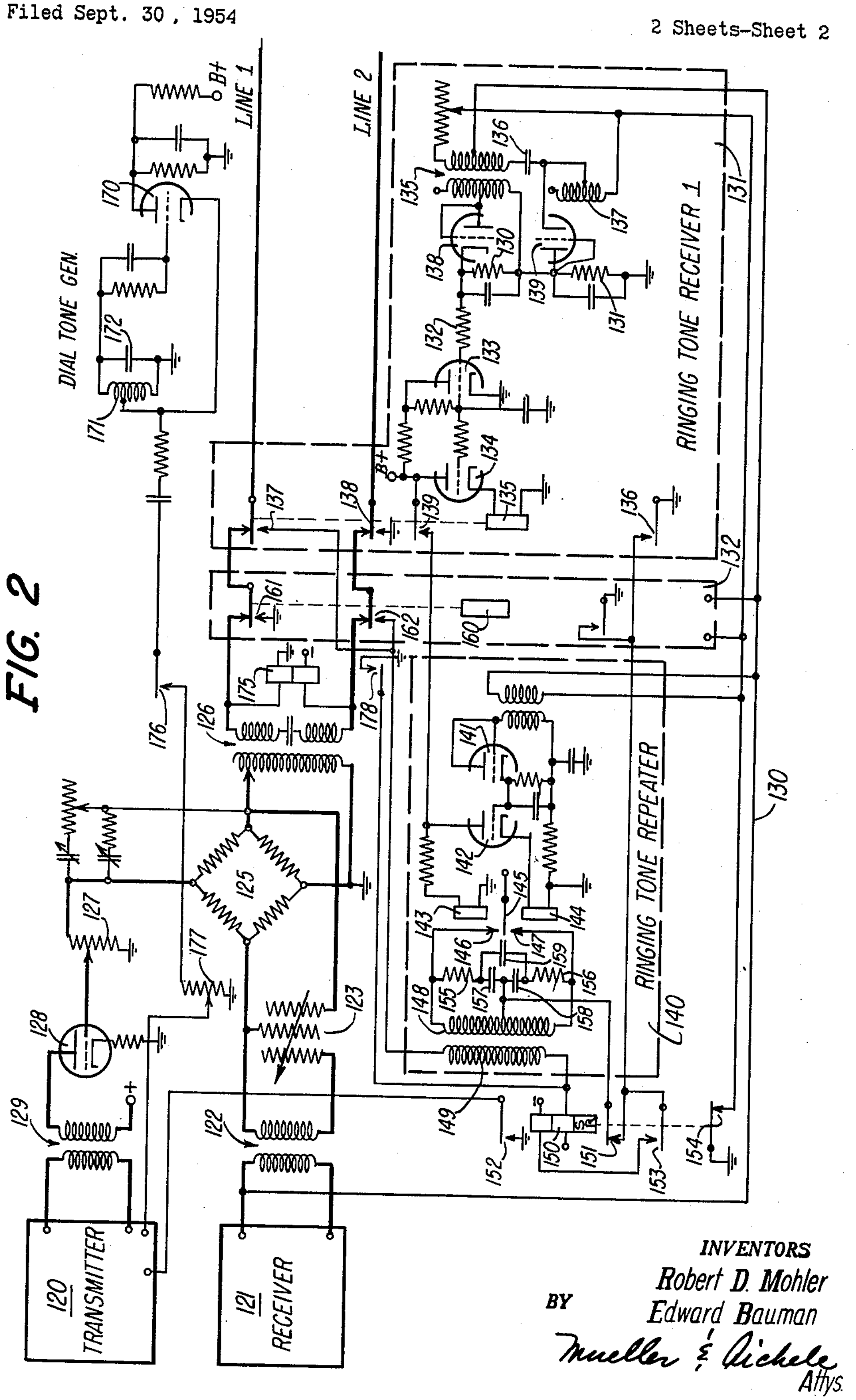

Further objects, features and the attending advantages of the invention will be apparent from a consideration of the following description when taken in connection with the accompanying drawings, in which:

Fig. 1 illustrates the equipment for connecting the telephone exchange with radio equipment; and Fig. 2 illustrates the equipment for connecting the telephone subscriber's extension to the radio equipment.

In practicing the invention there is provided self-contained apparatus for connecting radio or carrier transmitting and receiving equipment to bridge a gap in a telephone line extending from a central exchange to a subscriber's line connected to one or more extensions. The equipment includes a hybrid network for connecting the line from the exchange to the transmitter and receiver of the radio equipment for coupling voice signals thereto. Control equipment is also included for producing a tone of an audio frequency which can be transmitted over the radio equipment when ringing is present on the line from the exchange. The frequency of the tone generated can be shifted to identify the line upon which ringing is provided, that is, on whether the ringing is from line 1 or line 2 with respect to ground or between the lines. The tone generated is keyed by the ringing signal so that bursts or pulses thereof are transmitted. The equipment at the subscriber end of the radio link also includes a hybrid for making connection between the radio transmitter and receiver and the line. The ringing tone received is applied to control equipment which connects a battery reversing network inductively to the telephone line. The battery reversals follow the frequency of the bursts of the tone to thereby produce alternating current on the line of the same frequency as the ringing current at the exchange end. This equipment also includes control means responsive to the frequency of the tone for applying the ringing current in the same manner it was applied from the exchange. Provisions may also be provided for dialing, in which case a generator for producing a tone is provided at the subscriber end of the system, with this generator being keyed by the dial pulses from the line. The keyed tone received at the exchange end operates a relay to make a direct current connection between the lines to the central exchange to provide in effect dial pulses over the line.

Referring now to the drawing, the lines 1 and 2 of Fig. 1 extending from the central exchange are connected to the divided windings 10 and 11 of the transformer 12, with the windings being selectively connected through contacts 21 of relay 20. The winding 13 of the transformer is connected through the contacts 26 of relay 25 to the hybrid 30. Signals from the hybrid are applied through potentiometer 31 to the amplifier including triode tube 32, the output of which is connected to the winding 33 of the transformer 34. Secondary 35 of this transformer is connected to the radio transmitter 36 which transmits the signals to a radio receiver at the subscriber end of the radio link. The adjustable potentiometer 31 controls the level of the signal applied to the transmitter.

The hybrid 30 is also connected through the adjustable pad 37 and the filter 38 to the winding 39 of transformer 40. The filter 38 rejects the control tones received as will be further described. The secondary 41 is connected to the receiver 42 which receives signals from the subscriber end of the radio link. The construction of the hybrids, and connections of the transmitter and receiver thereto are standard and will not be described in detail.

These connections provide interconnection of the audio from the lines 1 and 2 to the transmitter and interconnection of the audio received from the receiver 42 to the lines 1 and 2. For providing precise balance of the hybrid 30, the circuits 28 and 29 are provided, each of which includes a variable resistor for providing adjustment.

In order to detect ringing on lines 1 and 2 from the exchange, connection is made from the inner terminals of the windings 10 and 11 to a circuit formed of resistors 50 and 51 and condensers 52 and 53. This provides a voltage in the presence of low frequency ringing currents whether between the two lines or between either line and ground. This voltage is applied to the rectifier formed by the triode section 55, being applied to the grid and plate of the rectifier which are connected together and to ground through resistor 56 and condenser 57. The cathode of the rectifier is connected to ground through resistor 58 and condenser 59 and develops a direct current voltage thereacross. This voltage is applied to the amplifier formed of the triode section 60 being applied to the grid thereof through resistor 61. In the plate of the amplifier there is connected the relay 62 including two sets of contacts 63 and 64. Contacts 63 provide a ground to the transmitter for operating the transmitter when ringing current is received. The contacts 63 also energize pilot light 65 to show that the transmitter is energized. The contacts 64 provide a connection from B+ through contacts 22 of relay 20 for providing B+ potential to the ringing signal generator and control means therefor as will be described.

Connected similarly to the first ringing detector is a second detector circuit including resistors 70 and 71 and condensers 72 and 73. This circuit will apply ringing current whether from either line to ground or between the lines to the detector formed by the triode section 75. Currents are applied to the grid of the detector which is biased by the voltage divider formed by resistor 76 connected to +B and resistor 77 connected to ground. The plate of the triode is also connected to +B through resistor 78 and provides a gating voltage as will be further described.

A third ringing current detector is provided this detector circuit being connected only to line 2 through the coil 11. In the presence of ringing current between line 2 and ground, current is applied through condenser 80 and resistor 81 to the grid and plate of the detector triode 82 which are interconnected and which are grounded through resistor 83. The detected voltage is developed at the cathode which is connected to ground through resistor 84 and condenser 85. This voltage is applied through resistor 86 to the triode section 87 which serves as an amplifier. The output of the amplifier is supplied to the triode section 88 which serves as a modulator as will be more fully described.

For providing a tone at an audio frequency which can be transmitted over the radio transmitter, an oscillator of the Hartley type is provided which is formed by the triode 90 and the tuned circuit including coil 91 and condenser 92. This circuit will oscillate at a predetermined frequency depending upon the value of inductance of the coil 91 and the capacitance of the condenser 92. The resonant frequency of the tuned circuit is modified by action of the condenser 93 which is connected thereto and to the cathode of the modulator tube 88. The condenser 93 is effective to lower the frequency of oscillations with respect to the frequency produced by the coil 91 and condenser 92 alone.

When a ringing current is received on line 2, and is detected by the rectifier 82, a voltage is produced which is amplified in tube 87 and which cuts off the tube 88. This in effect opens the circuit of the condenser 93 so that the oscillator oscillates at a higher frequency. When the oscillator is energized in response to ringing current and there is no current on line 2, the tube 88 conducts to connect the condenser 93 in the circuit and the frequency of the tone will decrease. Accordingly the oscillator which includes the tube 90 will produce tones which shift from one frequency to the other depending upon which line the ringing current is on. As an example the oscillator may operate at a frequency of 2800 c.p.s. when ringing is present on line 2 and at a frequency of 2600 c.p.s. when ringing is present on line 1.

The audio frequency tone produced by the oscillator 90 is applied through condenser 95 to the cathode of tube 96 and the plate of tube 97. The plate of tube 96 and cathode of tube 97 are connected together for applying a signal therefrom through condenser 98 to the potentiometer 99. The tubes 96 and 97 are normally non-conducting but are rendered conducting by a positive voltage from the tube 75 which will be applied through resistor 100 to the grids of the tubes 96 and 97. This positive potential is produced during the negative half cycles of the ringing current. The tube 75 therefore operates to key the gate formed by tubes 96 and 97 to allow the tone to be applied therethrough when the negative half cycles of ringing current are received and to block the gate when the positive portions of the ringing current are received. As the tubes 96 and 97 are in opposite polarity both halves of the cycles of the tone generated by the oscillator 90 are passed therethrough. This tone is applied from potentiometer 99 to the winding 101 and through transformer 34 to the transmitter 36.

At the exchange end of the system there is also included equipment for receiving an audio frequency tone which controls dialing. This tone is present when the subscriber handset is removed, and is interrupted by the dial. The tone is selected from the output of the receiver 42 by the frequency selective network including transformer 105 and a tuned circuit including condenser 106 and inductor 107. This selective network may be in accordance with the patent application of Edward Bauman Serial No. 267,-887 filed Jan. 23, 1952, assigned to the same assignee as the present invention. The outputs derived by detectors 108 and 109, illustrated as triodes and connected as diodes, are developed across resistor 110 and condenser 111, and across resistor 112 and condenser 113, respectively. These outputs are differentially combined and applied through resistor 114 to the triode 115, with the output thereof being amplified by the triode 116 and operating the relay 20. Accordingly when a predetermined tone frequency is received, the relay 20 will be operated. During dialing, this tone is interrupted to intermittently close contacts 21 and establish a direct current circuit through the lines 1 and 2 as is usually accomplished by dialing pulses. During talking the relay 20 is continuously held operated by the tone, with the tone being removed from the voice circuits by the filter 38. Relay 20 opens contacts 22 so that there is no possibility of the operation of the ringing tone equipment, and closes contacts 23 to apply B+ to the tube 32 during normal voice operation. A positive potential is applied from B+ through resistor 118 to render tube 60 conducting to operate relay 62 so that contacts 63 thereof close to energize the transmitter 36.

Considering now the equipment at the subscriber end of the line there is illustrated a radio transmitter 120 and radio receiver 121 which may be generally similar to the transmitter and receiver 36 and 42 in the system of Fig. 1. Signals from the receiver 121 are applied through transformer 122 and the adjustable pad 123 to the resistive hybrid 125. This hybrid is generally similar to the hybrid 30 of Fig. 1. The output of the hybrid is applied through transformer 126 to the lines 1 and 2 extending to the subscriber's station. Voice signal received on the lines are applied through the transformer 126 and hybrid 125 to the potentiometer 127. The level is set by the potentiometer and the signal is then applied through amplifier 128 and transformer 129 to the radio transmitter 120.

The signal from the receiver 121 is also applied to line 130 which is applied to at least one ringing tone receiver 131. A second ringing tone receiver 132 is shown in block diagram and when provided may be of exactly the same construction as the receiver 131. The tone from the receiver is applied to a frequency selective network including transformer 135, condenser 136 and coil 137. The selective tone receivers respond to the frequency of the tone itself and not to the bursts, and may be similar to the selective tone receiver of Fig. 1 which responds to dial the pulses. The detector tubes 138 and 139 provide signals across resistors 130 and 131 which are combined differentially thereacross and applied through resistor 132 to the triode 133. This triode is rendered conducting when a particular frequency is received and the signal is amplified in the triode 134 which has relay 135 connected in the cathode circuit thereof. This operates the relay 135 to apply ringing current to the telephone lines as will be described.

Also connected to the line 130 from the receiver is the ringing tone repeater 140 which includes detector 141 which responds to the slow amplitude variations of the received wave. As has been stated, the ringing tone is gated by the ringing current impressed on the line to thereby provide bursts of the tone. Accordingly, the tube 141 will conduct only during the bursts and the voltage developed thereacross is amplified in the triode 142. The amplifier 142 of the ringing tone repeater is energized by the ringing tone receiver through contacts 139 of relay 135. The triode 142 energizes relay coils 143 and 144 connected to the plate and cathode thereof, which are coils of a single differential relay which causes the contact 145 to move between contacts 146 and 147. The contact 145 is connected to a negative potential and alternately applies this potential to contacts 146 and 147, with the circuit being completed from the center tap on the winding 148 through contacts 151 of relay 150 and the contacts 136 of relay 135 which has been closed as previously stated. Resistors 155 and 156 and condensers 157, 158 and 159 provide spark protection. Currents of opposite polarity will therefore be developed in the winding 148 by the selective connection of the source from one side to the other thereof. This current is induced into winding 149 and is superimposed on the direct current connected to winding 149 and applied to contact 137 of the relay 135 so that when the relay 135 operates, the current is applied to line 1. At the same time line 2 is grounded through contacts 138.

The ringing current is applied on lines 1 and 2 until the party at the remote end answers. At this time relay 150 operates to close contacts 152 and 153 and to open contacts 151 and 154. The contacts 152 energize the transmitter 120, and contacts 153 establish a holding circuit for relay 150 through contacts 136 of relay 135. The contacts 151 act to interrupt the ringing current and contacts 154 remove the tone signal from the ringing tone receiver. Removal of this tone causes the relay 135 to be deenergized which connects the telephone line to the transformer 126 and relay 175. Relay 175 now operates to close contacts 176 and 178. Contacts 178 form a holding circuit for holding the relay 150 energized throughout the remainder of the telephone conversation. The holding circuit for relay 150 through contacts 135 thereof and contacts 136 of relay 135 has been broken by deenergization of relay 135. It is therefore seen that the relay 150 controls the energization of the transmitter so that two-way communication can be provided when the called extension answers or when a call is initiated from an extension.

As previously stated, the ringing tone receiver No. 1 will operate when a particular tone is received. If it is desired to reproduce ringing only between the lines, or from one line to ground, only one receiver is required. However, if other ringing connections are used a second receiver 132 may be required. The receiver designated as 132 will respond to a different tone and operate to energize relay 160 thereof. This will close contacts 161 and 162 to ground line 1 and to apply the ringing current to line 2. Accordingly, the ringing current developed by the repeater 140 will either be applied to line 1 or line 2 depending on whether the original ringing current was on line 1 or line 2, with this action being controlled by the frequency of the tones applied.

In order to transmit dial pulses a dial tone generator is provided including the oscillator 170 having inductor 171 and condenser 172 which form a tuned circuit for controlling the frequency of oscillations. The dial tone may have a frequency of 3000 cycles per second, for example. Oscillations are applied through contacts 176 of relay 175, and through potentiometer 177 to the transmitter 120. The generator operates continuously, with the tones being applied only during the operation of relay 175. This relay operates when the lines are interconnected at the subscriber station as when the handset is removed from the base, so that the dial tone is applied continuously during a conversation. The dial tone is interrupted by relay 175 during dialing. This tone is then transmitted through the radio transmitter and is received at the equipment connected to the central exchange for operating the dial tone receiver previously described. This receiver alternately removes the short on the lines extending to the central exchange in response to the interrupted tone to thereby transfer the dial pulses which were initiated by the calling extension.

It is therefore seen that a system is provided for connecting a radio or carrier link in a telephone line, wherein the link transmits voice signals in both directions and provides and transmits tones for controlling dialing and ringing operations. The system is of general application and will transfer ringing current which is applied in various ways; that is, from either line to ground or between the lines, and/or which may be of different frequencies.

Accordingly, the same equipment can be used with various different telephone systems without requiring modification for use in any particular system. This equipment makes it unnecessary to provide a fresh ringing source at the subscriber end of the system but permits the development of ringing current from a direct current source, with the current being completely controlled both as to frequency and as to the manner in which it is applied. This greatly simplifies the equipment as compared to equipment in which a fresh ringing source is required.

Although one embodiment of the invention has been disclosed which is illustrative thereof, it is obvious that various changes and modifications can be made therein without departing from the intended scope of the invention as defined in the appended claims.

We claim:

1. A system for reproducing low frequency telephone ringing current which appears in one telephone line in a second telephone line which is connected to the first line by a carrier wave channel, said system including in combination, generator means for producing a signal wave of a frequency suitable for transmission over the carrier wave channel, gating means operated by the ringing current in the one telephone line for passing said signal wave during one half of each cycle of said ringing current to produce bursts of said signal wave and intervals therebetween of substantially the same duration as said bursts, carrier wave means for transmitting and receiving said gated signal wave, a source of direct current, relay means coupled to said source and having output terminals coupled to the second telephone line, and means for applying said gated signal wave to said relay means, said relay means selectively connecting said source of current to said output terminals thereof in one polarity in response to a burst of said signal wave and in the opposite polarity in the absence of a burst to thereby produce an alternating current wave in the second telephone line.

2. A system for reproducing low frequency telephone ringing current which appears in one telephone line in a second telephone line which is connected to the first line by a radio channel, wherein the ringing current may be any one of a plurality of frequencies within a predetermined range, said system including in combination, generator means for producing a signal wave of a frequency suitable for transmission over the radio channel, gating means operated by the ringing current in the one telephone line for passing said signal wave during one half of each cycle of said ringing current to produce bursts of said signal wave and intervals therebetween of substantially the same duration as said bursts, means providing a radio channel for transmitting and receiving said gated signal wave, a source of direct current, relay means coupled to said source and having output terminals coupled to the second telephone line, and means for applying said gated wave to said relay means, said relay means selectively connecting said source of direct current to said output terminals thereof in one polarity in response to a burst of said signal wave and in the opposite polarity in the absence of a burst to thereby produce an alternating current wave in the second telephone line.

3. A system for reproducing low frequency telephone ringing current which appears in a first telephone line in a second telephone line which is coupled to the first line by a radio channel, wherein the ringing current may be selectively applied on one of a plurality of conductors of the lines and may be of any frequency within a predetermined range, said systems including in combination, generator means for producing a signal wave for transmission over the radio channel, said generator means including means coupled to said first telephone line for shifting the frequency of said signal wave in response to the presence of ringing current on a particular conductor thereof, gating means operated by the ringing current for passing said signal wave during one half of each cycle of said ringing current to produce bursts of said signal wave and intervals therebetween of substantially the same duration as said bursts, with the frequency of said bursts being the same as the frequency of the ringing current, means providing a radio channel for transmitting said gated signal wave, a source of direct current, first relay means having output terminals, means for applying said gated signal wave to said first relay means, said first relay means selectively connecting said source of current to said output terminals thereof in one polarity in response to a burst of said signal wave and in the opposite polarity in the absence of a burst to thereby produce an alternating current wave of the frequency of the ringing current, second relay means responsive to the frequency of said signal wave for selectively connecting said output terminals to the conductors of said second telephone line, and means for applying said gated signal wave to said second relay means for controlling the application of said produced alternating current wave to said conductors in accordance with the frequency of said signal wave.

4. A system for reproducing low frequency telephone ringing current which appears in a first telephone line in a second telephone line which is connected to the first line by a carrier wave channel, wherein the ringing current may be selectively applied on one of a plurality of conductors of the lines and may be of any frequency within a predetermined range, said systems including in combination, generator means for producing a signal wave for transmission over the carrier channel, said generator means including means coupled to said first telephone line for shifting the frequency of said signal wave in response to ringing current on a particular conductor thereof, gating means operated by the ringing current for passing said signal wave during one half of each cycle of said ringing current to produce bursts of said signal wave and intervals therebetween of substantially the same duration as said bursts, with the frequency of said bursts being the same as the frequency of the ringing current, means for transmitting said gated wave over said carrier wave channel, a source of direct current, first and second relay means, and means for applying said gated wave to said first and second relay means, said first relay means having output terminals and selectively connecting said source of current to said output terminals thereof in one polarity in response to a burst of said signal wave and in the opposite polarity in the absence of a burst to thereby produce an alternating current wave of the frequency of the ringing current, said second relay means being responsive to the frequency of said signal wave for selectively connecting said output terminals to the conductors of said second telephone line in accordance to the frequency of said signal wave.

5. A system for reproducing low frequency telephone ringing current which appears in a first telephone line in a second telephone line which is connected to the first line by a carrier wave channel, wherein the lines each include a plurality of conductors and the ringing current may be selectively applied on one of the conductors of each line, said system including in combination, generator means controlled by said ringing current for producing a signal wave for transmission over the carrier wave channel, said generator means including means coupled to said first telephone line for shifting the frequency of said signal wave in response to ringing current on a particular conductor thereof, means providing a carrier wave channel for transmitting said signal wave, means for receiving said signal wave, means controlled by the received signal wave for producing ringing current, and relay means responsive to the frequency of said signal wave for selectively applying said produced ringing current to the conductors of said second telephone line in accordance with the frequency of said signal wave, with ringing current being applied to the conductor of said second line corresponding to the conductor of said first line on which ringing current appears.

6. A system for reproducing low frequency telephone ringing current which appears in a first telephone line in a second telephone line which is connected to the first line by a radio channel, wherein the lines each include a plurality of conductors and the ringing current may be selectively applied on one of the conductors of each line, said system including in combination, generator means for producing a signal wave for transmission over the radio channel, said generator means including means coupled to said first telephone line for gating said signal wave and shifting the frequency thereof in response to ringing current on a particular conductor thereof, means providing a radio channel for transmitting and receiving said signal wave, means controlled by the received signal wave for reproducing the ringing current from a direct current source, and relay means responsive to the frequency of said signal wave for selectively connecting said reproduced ringing current to the conductors of said second telephone line in accordance with the frequency of said signal wave.

7. A system for transmitting telephone ringing currents at frequencies in the relatively low audio frequency range from a first telephone line over a carrier channel to a second telephone line, said systems including in combination, generator means for producing a wave of relatively high audio frequency, gating means operated by the ringing current in the first telephone line for intermittently passing said high frequency wave during one half of each cycle of said ringing current to produce regularly receiving bursts of said high frequency wave and intervals therebetween of substantially the same duration as said bursts, whereby the frequency of said bursts is the same as the frequency of said ringing current, means for modulating a carrier wave by said gated high frequency wave and for transmitting the same, means for receiving the modulated carrier wave and for deriving the gated high frequency wave therefrom, means providing direct current, relay means coupled to said direct current means and having output terminals coupled to the second telephone line, and means for applying said gated high frequency wave to said relay means, said relay means selectively connecting said direct current to said output terminals thereof in one polarity in response to a burst of said high frequency wave and connecting said direct current to said terminals with the opposite polarity in the absence of a burst to thereby produce in the second telephone line an alternating current wave of the frequency of said ringing current.

References Cited in the file of this patent

UNITED STATES PATENTS

| | | |
|---|---|---|
| 1,688,455 | Demarest | Oct. 23, 1928 |
| 2,202,474 | Vroom | May 28, 1940 |
| 2,299,487 | Moore | Oct. 20, 1942 |
| 2,424,961 | Bancroft et al. | Aug. 5, 1947 |
| 2,654,804 | Edson | Oct. 6, 1953 |

OTHER REFERENCES

Moore: "Rural Radio Telephone Experiment at Cheyenne Wells, Colorado," AIEE Tecn. Paper 47-83, December 1946.